(12) United States Patent
Niiyama (10) Patent No.: US 11,707,829 B2
(45) Date of Patent: Jul. 25, 2023

(54) WORKING MACHINE INCLUDING SPEED INCREASER AND SPEED REDUCER

(71) Applicant: Makita Corporation, Anjo (JP)

(72) Inventor: Takuma Niiyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 176 days.

(21) Appl. No.: 17/016,591

(22) Filed: Sep. 10, 2020

(65) Prior Publication Data

US 2021/0078154 A1 Mar. 18, 2021

(30) Foreign Application Priority Data

Sep. 12, 2019 (JP) .............................. JP2019-166612

(51) Int. Cl.
*B25F 5/00* (2006.01)
*A01G 3/053* (2006.01)
*A01G 3/08* (2006.01)
*F16H 1/14* (2006.01)
*F16H 1/08* (2006.01)

(52) U.S. Cl.
CPC .............. *B25F 5/006* (2013.01); *A01G 3/053* (2013.01); *A01G 3/085* (2013.01); *F16H 1/08* (2013.01); *F16H 1/14* (2013.01)

(58) Field of Classification Search
CPC . B25F 5/001; B25F 5/006; B25F 3/00; H02K 7/145; B25B 21/008; B25B 13/467; B25B 13/48; B25B 13/481; B23Q 5/12; F16H 2057/02039; F16H 2057/0335; F16H 57/033

USPC ............. 173/216, 217, 140, 50, 47, 29, 213; 30/296.1, 381–387; 81/57, 57.11, 57.14, 81/57.3
See application file for complete search history.

(56) References Cited

U.S. PATENT DOCUMENTS

| 2002/0116826 | A1 | 8/2002 | Sanders et al. |
| 2005/0230133 | A1* | 10/2005 | Omi ...................... B23B 45/008 173/216 |
| 2008/0135271 | A1* | 6/2008 | Murphy ................ B25B 13/481 173/216 |

(Continued)

FOREIGN PATENT DOCUMENTS

| CN | 106312894 B | * | 1/2018 | ........... B25B 21/002 |
| CN | 208509663 U |   | 2/2019 |   |

(Continued)

OTHER PUBLICATIONS

Office Action dated Feb. 28, 2023 in Japanese Application No. 2019-166612.

*Primary Examiner* — T. Scott Fix
(74) *Attorney, Agent, or Firm* — Sughrue Mion, PLLC (57) ABSTRACT

A working machine may include a pipe, a body unit, a tool unit, a shaft, and a speed increaser. The body unit may be disposed at a rear end of the pipe and include a prime mover. The tool unit may be disposed at a front end of the pipe and include a front tool. The shaft may be disposed inside the pipe and be configured to transmit power of the prime mover to the front tool. The speed increaser may be disposed between the shaft and the front tool. The speed increaser may be configured to make a rotational speed of the front tool higher than a rotational speed of the shaft.

4 Claims, 7 Drawing Sheets

(56) References Cited

U.S. PATENT DOCUMENTS

| | | | |
|---|---|---|---|
| 2010/0288520 A1* | 11/2010 | Dayton | E04D 13/0765 |
| | | | 173/1 |
| 2011/0232436 A1* | 9/2011 | Morabit | A01D 34/4168 |
| | | | 83/13 |
| 2013/0029801 A1* | 1/2013 | Oberle | F16H 57/033 |
| | | | 74/411 |
| 2014/0262388 A1* | 9/2014 | Krause | B25F 5/001 |
| | | | 173/1 |
| 2015/0068050 A1* | 3/2015 | Pickett | B25F 5/02 |
| | | | 173/217 |
| 2015/0362062 A1 | 12/2015 | Yao | |
| 2017/0326712 A1* | 11/2017 | Li | H02K 1/146 |
| 2018/0104809 A1* | 4/2018 | Dyer | B27B 17/0016 |

FOREIGN PATENT DOCUMENTS

| | | | | |
|---|---|---|---|---|
| DE | 102016210047 A1 * | 12/2017 | | |
| JP | 2011-239789 A | 12/2011 | | |
| WO | WO-2008057023 A1 * | 5/2008 | | B25F 3/00 |

\* cited by examiner

WORKING MACHINE INCLUDING SPEED INCREASER AND SPEED REDUCER

CROSS-REFERENCE TO RELATED APPLICATION

This application claims priority to Japanese Patent Application No. 2019-166612 filed on Sep. 12, 2019, the entire contents of which are hereby incorporated by reference into the present application.

TECHNICAL FIELD

This disclosure herewith relates to a working machine.

BACKGROUND

Japanese Patent Application Publication No. 2011-239789 describes a working machine. The working machine comprises a pipe, a body unit, a tool unit, a shaft, and a speed reducer. The body unit comprises a prime mover and is disposed at a rear end of the pipe. The tool unit comprises a front tool and is disposed at a front end of the pipe. The shaft is disposed inside the pipe and is configured to transmit power of the prime mover to the front tool. The speed reducer is disposed between the shaft and the front tool. The speed reducer is configured to make a rotational speed of the front tool lower than a rotational speed of the shaft.

SUMMARY

In the above working machine, setting the rotational speed of the front tool high to ensure work performance of the front tool leads to an increase in the rotational speed of the shaft, and vibrations in the working machine accompanying the rotation of the shaft may thereby worsen. On the other hand, setting the rotational speed of the shaft low to suppress the vibrations in the working machine accompanying the rotation of the shaft leads to a decrease in the rotational speed of the front tool, and the work performance of the front tool may thereby deteriorate. The disclosure herein discloses a technique that can suppress both deterioration of work performance of a front tool and aggravation of vibrations in a working machine.

The disclosure herein discloses a working machine. The working machine may comprise a pipe, a body unit, a tool unit, a shaft, and a speed increaser. The body unit may be disposed at a rear end of the pipe and comprise a prime mover. The tool unit may be disposed at a front end of the pipe and comprise a front tool. The shaft may be disposed inside the pipe and be configured to transmit power of the prime mover to the front tool. The speed increaser may be disposed between the shaft and the front tool. The speed increaser may be configured to make a rotational speed of the front tool higher than a rotational speed of the shaft.

In the above configuration, the rotational speed of the shaft is lower than the rotational speed of the front tool, even if the rotational speed of the front tool is set high to ensure work performance of the front tool. Thus, vibrations in the working machine accompanying the rotation of the shaft can be suppressed as compared to a configuration in which the rotational speed of the shaft is equal to or higher than the rotational speed of the front tool. As a result, deterioration in the work performance of the front tool and aggravation of the vibrations in the working machine can both be suppressed.

DETAILED DESCRIPTION

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a working machine may comprise a pipe, a body unit, a tool unit, a shaft, and a speed increaser. The body unit may be disposed at a rear end of the pipe and comprise a prime mover. The tool unit may be disposed at a front end of the pipe and comprise a front tool. The shaft may be disposed inside the pipe and configured to transmit power of the prime mover to the front tool. The speed increaser may be disposed between the shaft and the front tool. The speed increaser may be configured to make a rotational speed of the front tool higher than a rotational speed of the shaft.

In the above configuration, the rotational speed of the shaft is lower than the rotational speed of the front tool, even if the rotational speed of the front tool is set high to ensure work performance of the front tool. Thus, vibrations in the working machine accompanying the rotation of the shaft can be suppressed as compared to a configuration in which the rotational speed of the shaft is equal to or higher than the rotational speed of the front tool. As a result, deterioration of the work performance of the front tool and aggravation of the vibration in the working machine can both be suppressed.

In one or more embodiments, the working machine may further comprise a speed reducer disposed between the shaft and the prime mover. The speed reducer may be configured to make the rotational speed of the shaft lower than a rotational speed of the prime mover.

The above configuration can make the rotational speed of the shaft low as compared to a working machine in which a speed reducer is not disposed between a shaft and a prime mover. Thus, the vibrations in the working machine accompanying the rotation of the shaft can be suppressed.

In one or more embodiments, the rotational speed of the prime mover may be higher than the rotational speed of the front tool.

In the above configuration, torque that is greater than output torque from the prime mover can be obtained in the front tool.

In one or more embodiments, the speed reducer may comprise helical gears.

The above configuration disperses teeth contact of the gears as compared to a configuration with spur gears. Thus, vibrations in the working machine accompanying torque change in the gears can be suppressed.

In one or more embodiments, the speed increaser may comprise bevel gears.

The above configuration allows a rotation axis of the front tool to vary relative to a rotation axis of the shaft.

In one or more embodiments, the prime mover may be a motor.

If the prime mover is an engine, vibrations of the engine itself are significant, thus the vibrations in the working machine are caused by the vibrations of the engine itself rather than by the vibrations accompanying the rotation of the shaft. On the other hand, if the prime mover is a motor, the motor itself hardly vibrates, thus the vibrations in the working machine are caused by the vibrations accompanying the rotation of the shat. The above configuration can suppress the vibrations in the working machine as compared to a configuration in which the prime mover is an engine.

In one or more embodiments, a support rod may comprise a pipe, a shaft, a first movable body, a first spring, and a second spring. The pipe may be extendable in its longitudinal direction. The shaft may extend inside the pipe in the longitudinal direction. The first movable body may be configured to move in the longitudinal direction relative to the pipe according to contraction and extension of the pipe. The first spring may be in contact with one end of the first movable body in the longitudinal direction. The second spring may be in contact with another end of the first movable body in the longitudinal direction. The pipe may comprise an outer pipe and an inner pipe. The outer pipe may accommodate the first movable body therein. The inner pipe may be inserted in the outer pipe and may be movable in the longitudinal direction relative to the outer pipe. The first movable body may comprise at least two first bearings configured to rotatably support the shaft. An interval between the at least two first bearings adjacent to each other in the longitudinal direction may be constantly smaller than each of lengths of the first spring and the second spring in the longitudinal direction.

In the above configuration, the first movable body comprises at least two first bearings, thus the first movable body supports the shaft at multiple points. Further, the first movable body moves in the longitudinal direction relative to the pipe according to contraction and extension of the pipe, thus even when the pipe extends or contracts, the at least two first bearings of the first movable body support the shaft at their post-movement positions. As such, the above configuration can suppress vibrations of the pipe accompanying the rotation of the shaft as compared to a configuration in which the shaft is supported at one point.

In one or more embodiments, the first movable body may further comprise a retainer configured to maintain a constant interval between the at least two first bearings adjacent to each other in the longitudinal direction.

In the above configuration, even when the pipe extends or contracts, the interval between the at least two first bearings adjacent to each other in the longitudinal direction is maintained constant. Thus, even though the length of the pipe changes accompanying the extension and contraction, the vibrations of the pipe accompanying the rotation of the shaft can stably be suppressed.

In one or more embodiments, the first movable body may further comprise a first support configured to support the at least two first bearings and the retainer.

In the above configuration, the at least two first bearings and the retainer can be integrated by the first support.

In one or more embodiments, the support rod may further comprise a second movable body disposed at one end of the inner pipe that is inserted to the outer pipe. The second movable body may comprise a second bearing configured to rotatably support the shaft.

According to the study by the inventor, it has been found that the pipe tends to vibrate at the one end of the inner pipe accompanying the rotation of the shaft. In the above configuration, the vibrations of the pipe accompanying the rotation of the shaft can be suppressed by the second bearing of the second movable body disposed at the one end of the inner pipe.

In one or more embodiments, the second movable body may further comprise a second support configured to support the second bearing. The second support may be inserted to the one end of the inner pipe.

In the above configuration, the second movable body can be arranged at the one end of the inner pipe by simple work of inserting the second support to the one end of the inner pipe.

In one or more embodiments, an engagement receiving portion may be disposed at the one end of the inner pipe. The second movable body may further comprise an engagement portion disposed on the second support and configured to engage with the engagement receiving portion.

In the above configuration, when the second movable body is positioned at the one end of the inner pipe, the engagement portion engages with the engagement receiving portion. This suppresses the second movable body from slipping from the one end of the inner pipe.

In one or more embodiments, the first spring may have a same configuration as the second spring.

In the above configuration, even when the pipe extends or contracts, the length of the first spring is the same as the length of the second spring. This facilitates design for a position of the first movable body in the longitudinal direction in the extendable pipe.

In one or more embodiments, the support rod may comprise at least two first movable bodies.

The above configuration can further suppress the vibrations of the pipe accompanying the rotation of the shaft as compared to a configuration in which the support rod comprises one first movable body.

In one or more embodiments, a working machine may comprise a support rod, a body unit, and a tool unit. The body unit may be disposed at a rear end of the support rod and comprise a prime mover. The tool unit may be disposed at a front end of the support rod and comprise a front tool. The support rod may comprise a pipe, a shaft, a first movable body, a first spring, and a second spring. The pipe may be extendable and contractable in its longitudinal direction. The shaft may extend inside the pipe in the longitudinal direction. The first movable body may be configured to move in the longitudinal direction relative to the pipe according to extension and contraction of the pipe. The first spring may be in contact with one end of the first movable body in the longitudinal direction. The second spring may be in contact with another end of the first movable body in the longitudinal direction. The pipe may comprise an outer pipe and an inner pipe. The outer pipe may accommodate the first movable body therein. The inner pipe may be inserted in the outer pipe and may be movable in the longitudinal direction relative to the outer pipe. The first movable body may comprise at least two first bearings configured to rotatably support the shaft. An interval between the at least two first bearings adjacent to each other in the longitudinal direction may be constantly smaller than each of lengths of the first spring and of the second spring in the longitudinal direction.

In the above configuration, the first movable body comprises the at least two first bearings, thus the first movable body supports the shaft at multiple points. Further, the first movable body moves in the longitudinal direction relative to the pipe according to extension and contraction of the pipe, thus even when the pipe extends or contracts, the at least two first bearings of the first movable body support the shaft at their post-movement positions. Thus, the above configuration can suppress vibrations of the pipe accompanying the rotation of the shaft as compared to a configuration in which the shaft is supported at one point. Consequently, vibrations in the working machine can be suppressed.

(Embodiment)

Figure 1:
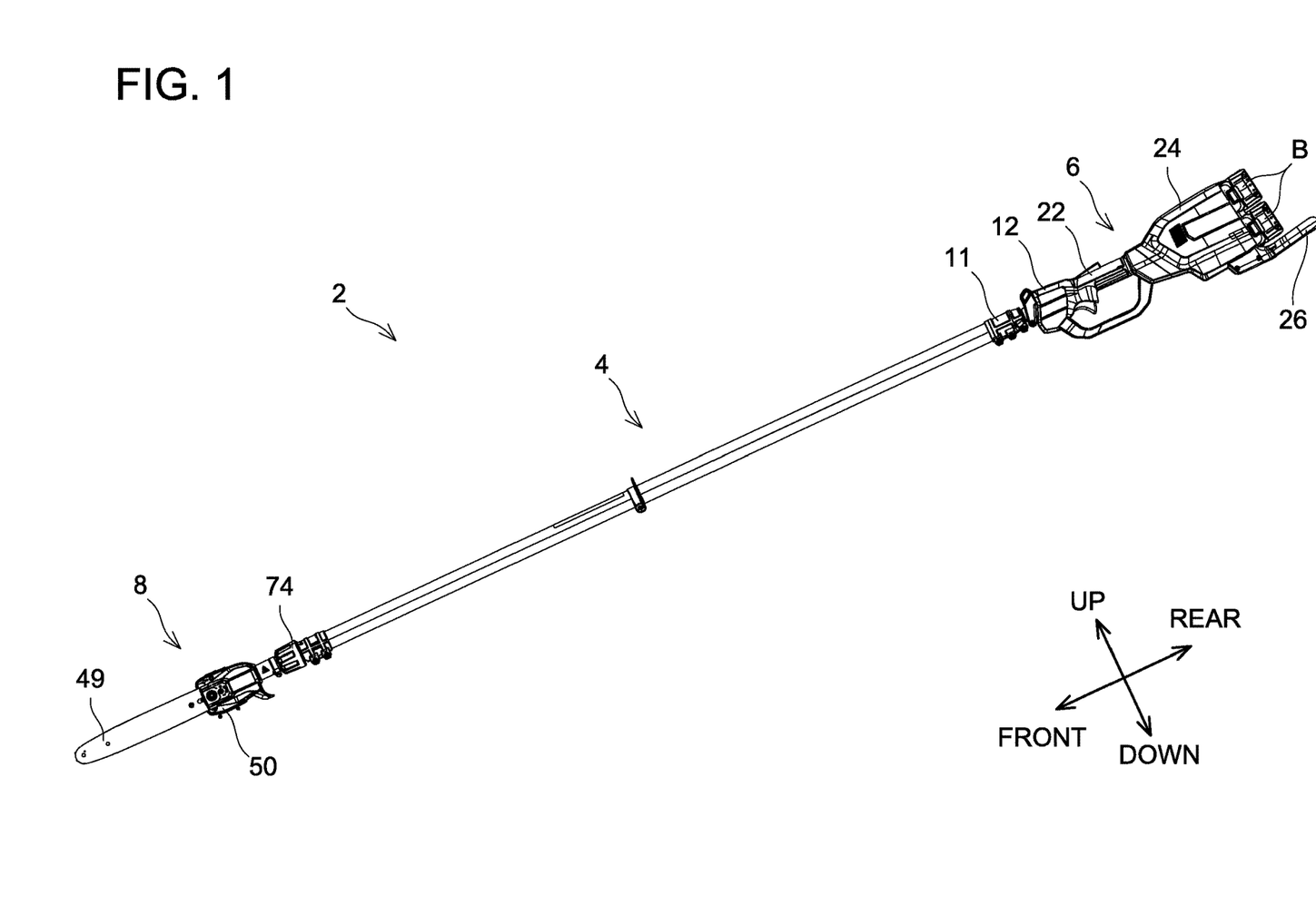
FIG. 1 is a side view of a working machine 2 in contracted state according to an embodiment.

A working machine 2 of an embodiment will be described with reference to FIGS. 1 to 7. The working machine 2 is a pole saw and is used for trimming high branches. As shown in FIG. 1, the working machine 2 comprises a support rod 4, a body unit 6, and a tool unit 8. The body unit 6 is disposed at a rear end of the support rod 4. The tool unit 8 is disposed at a front end of the support rod 4. In the present embodiment, a longitudinal direction of the working machine 2 is termed a front-rear direction, a direction perpendicular to the front-rear direction is termed a right-left direction, and a direction perpendicular to the front-rear direction and the right-left direction is termed an up-down direction.

Figure 2:
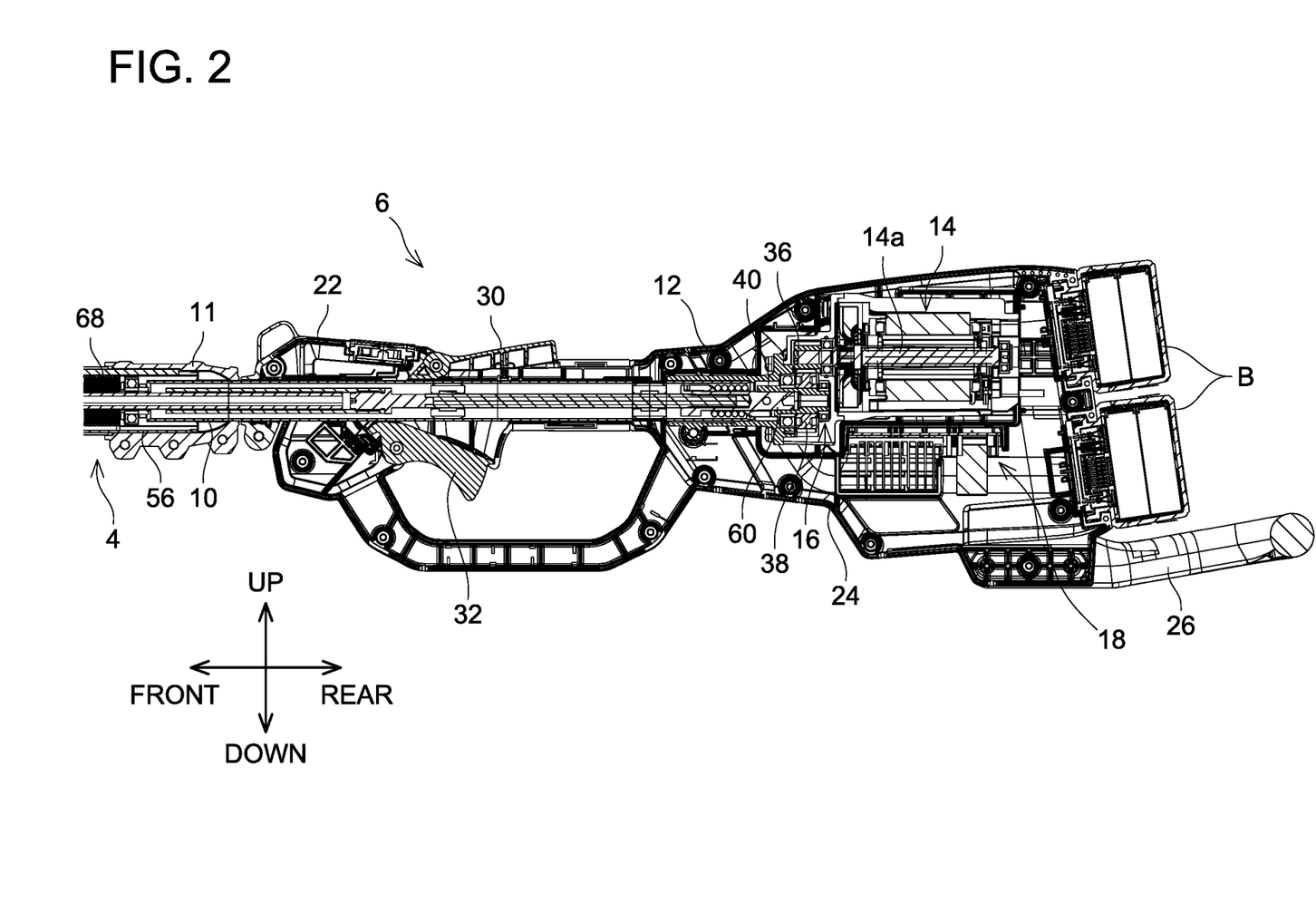
FIG. 2 is a cross-sectional view of a vicinity of a body unit 6 of the working machine 2 according to the embodiment.

As shown in FIG. 2, the body unit 6 comprises a body pipe 10, a stopper 11, a body housing 12, a motor 14, a speed reducer 16, and a control board 18. The body pipe 10 extends in the front-rear direction. The body pipe 10 is fixed to the rear end of the support rod 4 via the stopper 11.

The body housing 12 is fixed to the body pipe 10. The body housing 12 comprises a grip 22, an accommodating unit 24, and a handle 26. The grip 22 is configured to be gripped by an operator. The grip 22 is positioned at a front portion of the body housing 12. The body pipe 10 is inserted inside the grip 22. A trigger lock 30 and a trigger 32 are disposed on the grip 22. A press-in operation on the trigger 32 is prohibited when the trigger lock 30 is not pressed in, and the press-in operation on the trigger 32 is allowed when the trigger lock 30 is pressed in.

The accommodating unit 24 is disposed at a rear portion of the grip 22. The handle 26 is disposed at a rear lower surface of the accommodating unit 24. The handle 26 is configured to be held with the operator's hand that is not gripping the grip 22. A battery B is detachably attached to a rear surface of the accommodating unit 24. The battery B is, for example, a lithium ion battery.

The accommodating unit 24 accommodates the motor 14, the speed reducer 16, and the control board 18. The motor 14 is a prime mover, for example, a brushless motor. A motor shaft 14a of the motor 14 extends in the front-rear direction. When the trigger 32 is pressed in with the trigger lock 30 pressed in, the motor 14 is driven according to control of the control board 18.

The speed reducer 16 is disposed between the motor shaft 14a of the motor 14 and a shaft 60 (to be described later) and is configured to transmit rotation of the motor shaft 14a to the shaft 60. The speed reducer 16 comprises a first reduction gear 36 and a second reduction gear 38. The first reduction gear 36 and the second reduction gear 38 are helical gears. The first reduction gear 36 is coupled to a front end of the motor shaft 14a of the motor 14. The second reduction gear 38 is coupled to a rear end of the shaft 60 via a shaft receiver 40. The second reduction gear 38 meshes with the first reduction gear 36. The second reduction gear 38 and the first reduction gear 36 are arranged along the up-down direction. When the first reduction gear 36 rotates about its rotation axis extending in the front-rear direction, the second reduction gear 38 rotates about its rotation axis extending in the front-rear direction. The number of gear teeth of the first reduction gear 36 is less than the number of gear teeth of the second reduction gear 38. A rotational speed of the second reduction gear 38 is thereby lower than a rotational speed of the first reduction gear 36. Thus, a rotational speed of the shaft 60 is lower than a rotational speed of the motor shaft 14a of the motor 14.

Figure 3:
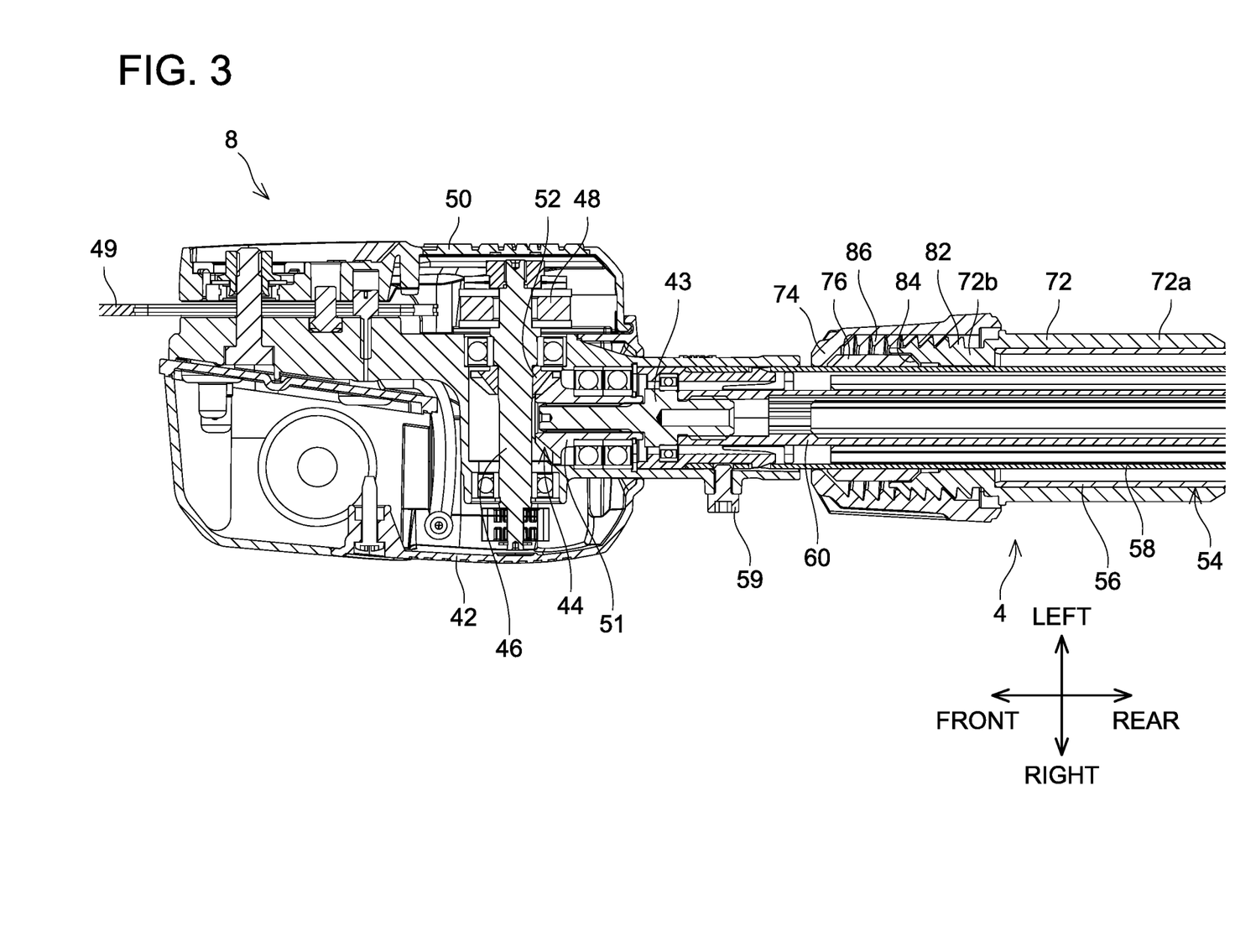
FIG. 3 is a cross-sectional view of a vicinity of a tool unit 8 of the working machine 2 according to the embodiment.

As shown in FIG. 3, the tool unit 8 comprises a tool housing 42, a speed increaser 44, a drive shaft 46, a sprocket 48, a guide bar 49, and a sprocket cover 50. The tool housing 42 houses the speed increaser 44.

The speed increaser 44 is disposed between the shaft 60 and the sprocket 48 and is configured to transmit the rotation of the shaft 60 to the sprocket 48. The speed increaser 44 comprises a first speed increasing gear 51 and a second speed increasing gear 52. The first speed increasing gear 51 and the second speed increasing gear 52 are bevel gears. The first speed increasing gear 51 is coupled to a front end of the shaft 60 via a shaft receiver 43. The second speed increasing gear 52 is coupled to the drive shaft 46. The second speed increasing gear 52 meshes with the first speed increasing gear 51. When the first speed increasing gear 51 rotates about its rotation axis extending in the front-rear direction, the second speed increasing gear 52 rotates about its rotation axis extending in the right-left direction. The number of gear teeth of the second speed increasing gear 52 is less than the number of gear teeth of the first speed increasing gear 51. A rotational speed of the second speed increasing gear 52 is higher than a rotational speed of the first speed increasing gear 51. Thus, a rotational speed of the drive shaft 46 is higher than the rotational speed of the shaft 60. Further, a product of a gear ratio in the speed reducer 16 (i.e., a ratio of the number of gear teeth of the second reduction gear 38 to the number of gear teeth of the first reduction gear 36) and a gear ratio in the speed increaser 44 (i.e., a ratio of the number of gear teeth of the second speed increasing gear 52 to the number of gear teeth of the first speed increasing gear 51) is greater than 1. Thus, the rotational speed of the drive shaft 46 is lower than the rotational speed of the motor shaft 14a of the motor 14.

The drive shaft 46 extends in the right-left direction. A left end of the drive shaft 46 extends to the outside of the tool housing 42. The sprocket 48 is fitted in the vicinity of the left end of the drive shaft 46. The sprocket 48 is disposed outside the tool housing 42. When the drive shaft 46 rotates, the sprocket 48 rotates at the same rotational speed as the drive shaft 46.

A saw chain (not shown) is strapped around the sprocket 48 and the guide bar 49. The guide bar 49 is fixed to an outer side of the tool housing 42 with a fastener. A longitudinal direction of the guide bar 49 is the front-rear direction, and a short direction of the guide bar 49 is the up-down direction. When the sprocket 48 rotates, the saw chain circulates along an edge of the guide bar 49. Objects such as branches are thereby cut.

Figure 4:
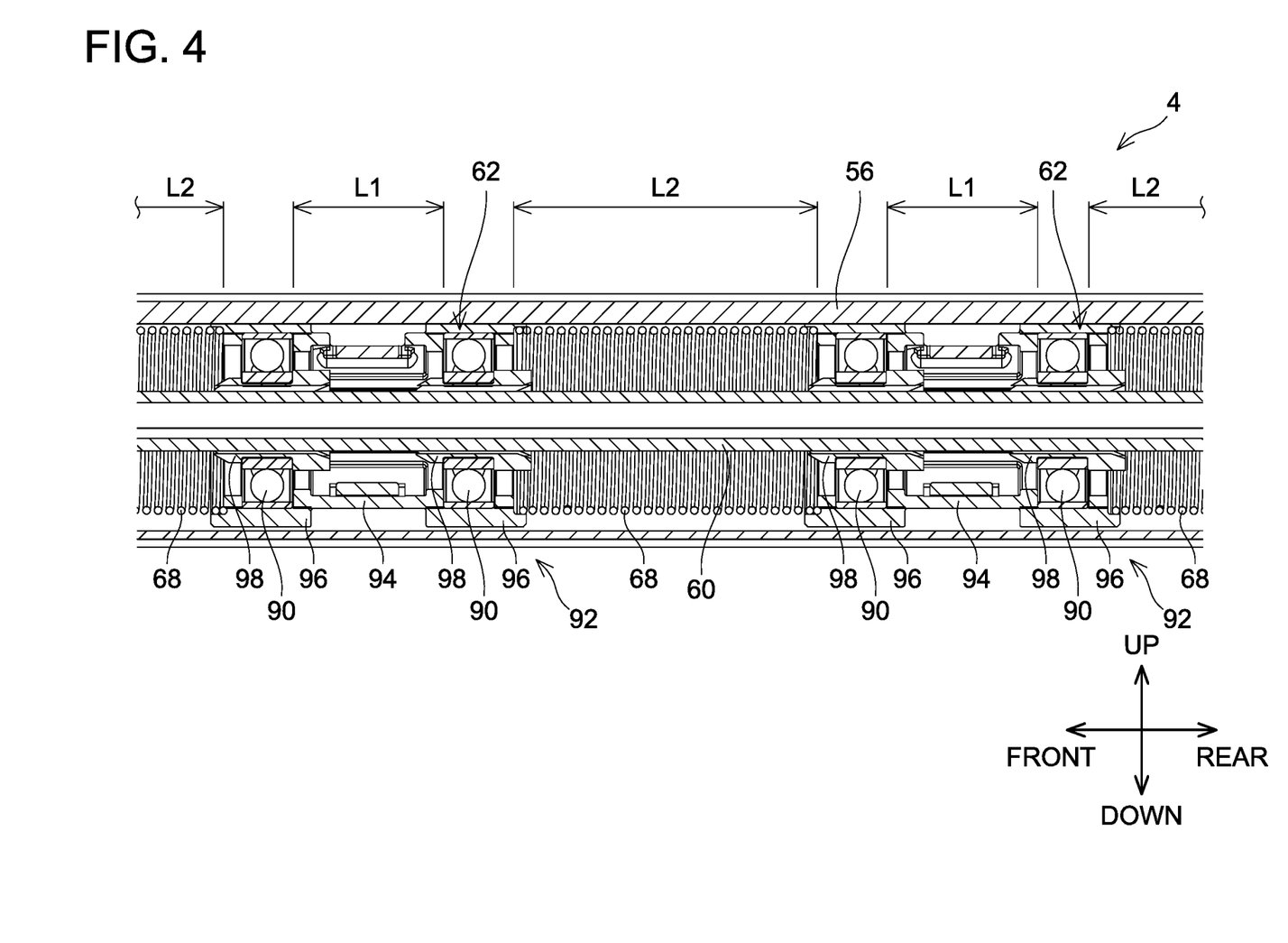
FIG. 4 is across-sectional view of a vicinity of first movable bodies 62 of the working machine 2 according to the embodiment.

As shown in FIG. 3, the support rod 4 comprises a pipe 54, the shaft 60, a plurality of (two in the present embodiment) first movable bodies 62 (see FIG. 4), a second movable body 64 (see FIG. 5), a third movable body 66 (see FIG. 6), and a plurality of (three in the present embodiment) springs 68 (see FIG. 4). The pipe 54 comprises an outer pipe 56 and an inner pipe 58. The outer pipe 56 is a cylinder extending in the front-rear direction. A rear end of the outer pipe 56 is fixed to the body pipe 10 via the stopper 11 (see FIG. 2). The outer pipe 56 accommodates therein the two first movable bodies 62 and the third movable body 66. The inner pipe 58 is inserted into the outer pipe 56 from a rear end of the inner pipe 58. The inner pipe 58 is a cylinder extending in the front-rear direction. The inner pipe 58 is fixed to the tool housing 42 with a fastener 59. An outer diameter of the inner pipe 58 is smaller than an inner diameter of the outer pipe 56.

Figure 5:
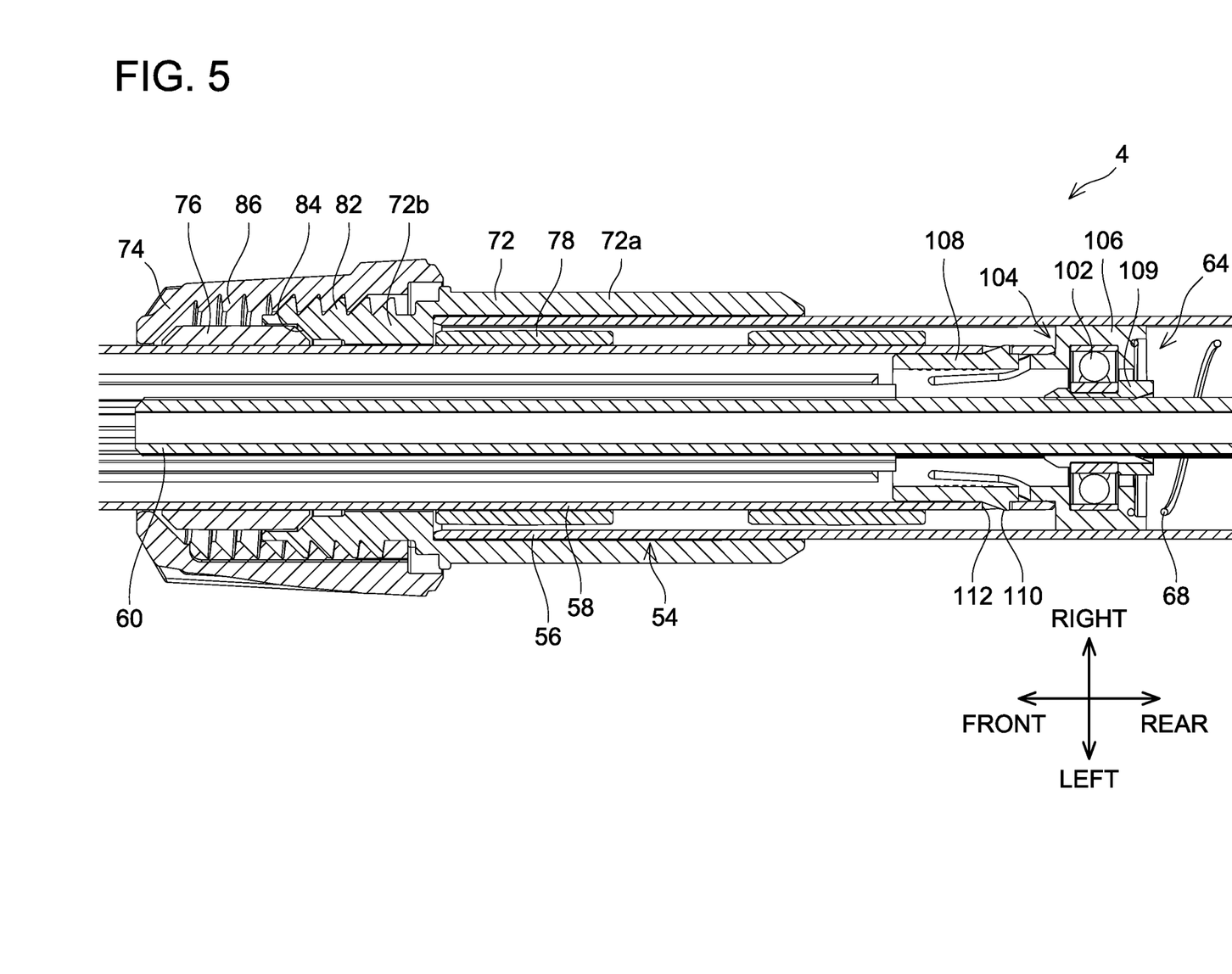
FIG. 5 is a cross-sectional view of a vicinity of a second movable body 64 of the working machine 2 according to the embodiment.

The support rod 4 further comprises a pipe holder 72, a stopper 74, a sleeve 76, and a slip stopper 78 (see FIG. 5). A rear portion 72a of the pipe holder 72 is fixed to a front end of the outer pipe 56 with a screw (not shown). An externally threaded portion 82 is on an outer circumferential surface of a front portion 72b of the pipe holder 72. An inclined portion 84 is on an inner circumferential surface of the front portion 72b of the pipe holder 72. A diameter of the inclined portion 84 decreases rearward.

The stopper 74 is a cylinder. An internally threaded portion 86 is on an inner circumferential surface of the stopper 74. The stopper 74 is fixed to the pipe holder 72 by the externally threaded portion 82 being screwed onto the internally threaded portion 86.

The sleeve 76 is a cylinder of which circumference is discontinued at one position in its circumferential direction. When the internally threaded portion 86 is not screwed on the externally threaded portion 82, an inner diameter of the sleeve 76 is larger than a diameter of an outer circumferential surface of the inner pipe 58 and thus the sleeve 76 does not hold the inner pipe 58. In this state, the inner pipe 58 is allowed to move in the front-rear direction relative to the outer pipe 56, thus the pipe 54 is allowed to extend or contract. This enables the operator to adjust the length of the pipe 54 according to working environment (such as a height of branches to be trimmed). When the externally threaded portion 82 is screwed onto the internally threaded portion 86, the sleeve 76 contacts the inclined portion 84 of the pipe holder 72 and an opening of the sleeve 76 becomes smaller than that of the sleeve 76 in its initial state. Thus, the inner diameter of the sleeve 76 is decreased, and the sleeve 76 thereby holds the inner pipe 58. In this state, the inner pipe 58 is not allowed to move in the front-rear direction relative to the outer pipe 56, thus the pipe 54 is not allowed to extend nor contract. This enables the operator to fix the pipe 54 at a desired length.

As shown in FIG. 5, the slip stopper 78 is fitted on the outer circumferential surface of the inner pipe 58 in the vicinity of the rear end thereof. The slip stopper 78 surrounds the outer circumferential surface of the inner pipe 58 entirely along the circumferential direction. A diameter of an outer circumferential surface of the slip stopper 78 is larger than a diameter of the inner circumferential surface of the front portion 72b of the pipe holder 72. The slip stopper 78 is in contact with the rear end of the front portion 72b of the pipe holder 72 in the front-rear direction. This prevents the inner pipe 58 from slipping from the outer pipe 56.

As shown in FIG. 4, the shaft 60 extends inside the outer pipe 56 and the inner pipe 58 in the front-rear direction. The shaft 60 is configured to transmit power of the motor 14 to the sprocket 48. The shaft 60 is extendable and contractable in the front-rear direction. The shaft 60 rotates, by being driven by the motor 14, about an axis extending in the front-rear direction.

The two first movable bodies 62 are disposed inside the outer pipe 56. Although not shown, the two first movable bodies 62 are disposed between the second movable body 64 and the third movable body 66 with respect to the front-rear direction of the pipe 54. The first movable bodies 62 each comprise a plurality of (two in the present embodiment) first bearings 90, a first holder 92, and a bush 98. The two first bearings 90 are separated from each other in the front-rear direction. The two first bearings 90 rotatably support the shaft 60 via the bush 98. In each first movable body 62, the two first bearings 90 support the shaft 60 at two points. The bush 98 is interposed between the first bearings 90 and the shaft 60. When the shaft 60 rotates, the bush 98 rotates as well with the shaft 60.

Each first holder 92 is constituted of a resin material. The first holder 92 does not rotate when the shaft 60 rotates. The first holder 92 comprises a retainer 94 and a support 96. The retainer 94 is interposed between the two first bearings 90. The retainer 94 is configured to maintain a constant interval L1 between the two first bearings 90 in the front-rear direction. The support 96 supports the two first bearings 90 and the retainer 94. Specifically, the support 96 is configured integrally with the retainer 94. The support 96 interposes the first bearings 90 between itself and the retainer 94. Thus, the support 96 integrates the two first bearings 90 with the retainer 94.

As shown in FIG. 5, the second movable body 64 comprises a second bearing 102, a second holder 104, and a bush 109. The second bearing 102 has the same configuration as the first bearings 90. The second bearing 102 rotatably supports the shaft 60 via the bush 109. The bush 109 is interposed between the second bearing 102 and the shaft 60. When the shaft 60 rotates, the bush 109 rotates as well with the shaft 60.

The second holder 104 is constituted of a resin material. The second holder 104 does not rotate when the shaft 60 rotates. The second holder 104 comprises a support 106, an insertion portion 108, and an engagement portion 110. The support 106 supports the second bearing 102. Specifically, the support 106 holds the second bearing 102 in the front-rear direction. A diameter of an outer circumferential surface of the support 106 is larger than a diameter of an inner circumferential surface of the inner pipe 58. The support 106 contacts the rear end of the inner pipe 58 in the front-rear direction. The insertion portion 108 extends frontward from a front end of the support 106. The insertion portion 108 is a cylinder that is slightly smaller than the diameter of the inner circumferential surface of the inner pipe 58. The engagement portion 110 protrudes outward from the outer circumferential surface of the insertion portion 108. An engagement receiving portion 112 that penetrates the inner pipe 58 in its thickness direction is at the rear end of the inner pipe 58. When the insertion portion 108 is inserted into the rear end of the inner pipe 58, the engagement portion 110 engages with the engagement receiving portion 112. As such, the second holder 104, that is, the second movable body 64, is fixed to the rear end of the inner pipe 58.

Figure 6:
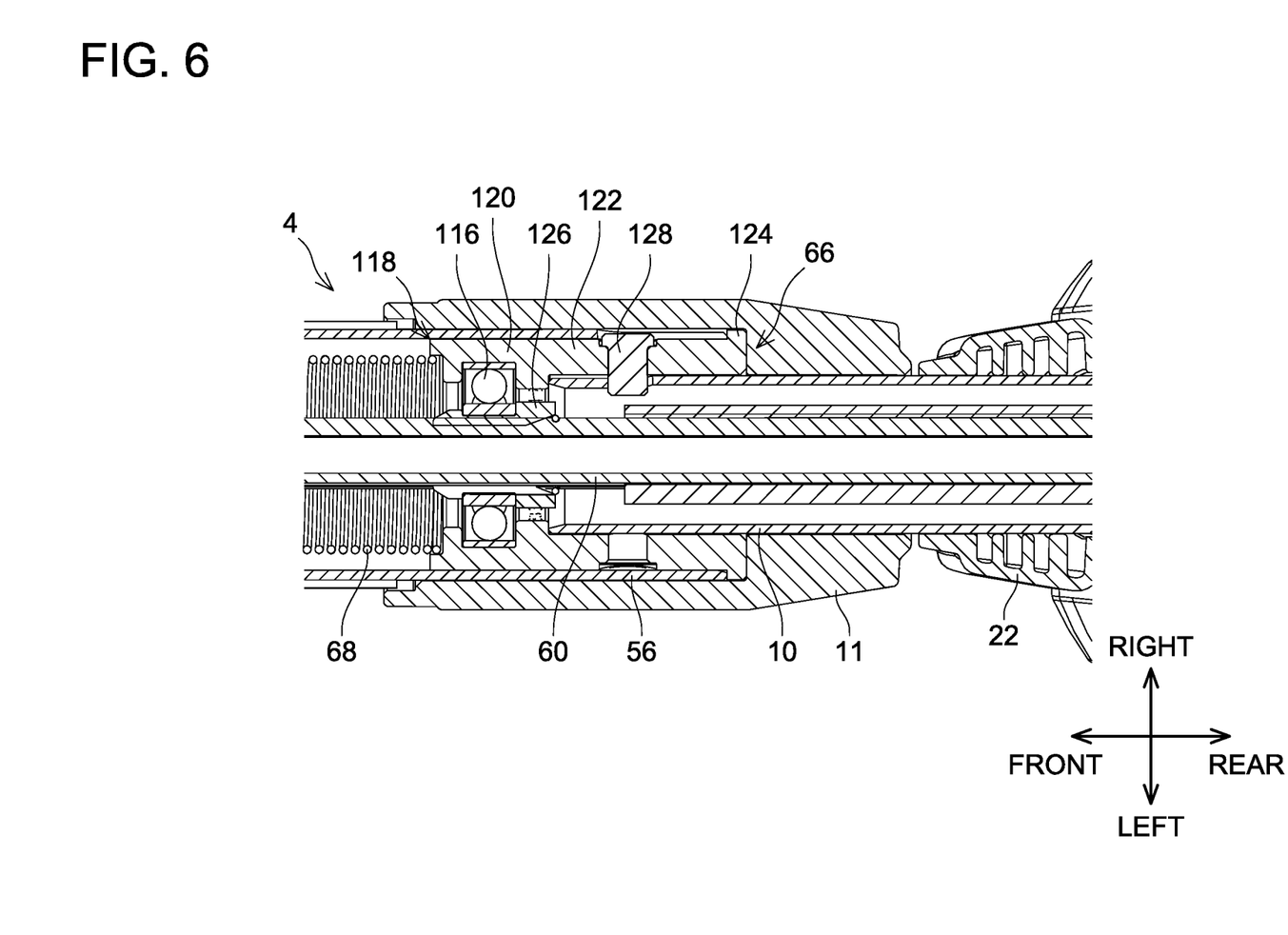
FIG. 6 is a cross-sectional view of a vicinity of a third movable body 66 of the working machine 2 according to the embodiment.

As shown in FIG. 6, the third movable body 66 comprises a third bearing 116, a third holder 118, and a bush 126. The third bearing 116 has the same configuration as the first bearings 90. The third bearing 116 rotatably supports the shaft 60 via the bush 126. The bush 126 is interposed between the third bearing 116 and the shaft 60. When the shaft 60 rotates, the bush 126 rotates as well with the shaft 60.

The third holder 118 is constituted of a resin material. The third holder 118 does not rotate when the shaft 60 rotates. The third holder 118 comprises a support 120, an insertion portion 122, and a step portion 124. The support 120 holds the third bearing 116 in the front-rear direction. The support 120 is inserted to the rear end of the outer pipe 56. A rear end of the support 120 contacts the body pipe 10. The insertion portion 122 extends rearward from the rear end of the support 120. The body pipe 10 is inserted to the insertion portion 122. The insertion portion 122 is inserted to the rear end of the outer pipe 56. The insertion portion 122 is fixed to the body pipe 10 with a fastener 128. The step portion 124 protrudes outward from a rear portion of an outer circumferential surface of the insertion portion 122. The step portion 124 is interposed between the rear end of the outer pipe 56 and the stopper 11 in the front-rear direction. As such, the third holder 118, that is, the third movable body 66, is fixed to the rear end of the outer pipe 56.

The three springs 68 have the same configuration (such as the same spring coefficient and length). One of the springs 68 is in contact with a rear end of the second movable body 64 and a front end of one of the first movable bodies 62. Another one of the springs 68 is in contact with a rear end of the one of the first movable bodies 62 and a front end of the other of the first movable bodies 62. The remaining one of the springs 68 is in contact with a rear end of the other of the first movable bodies 62 and a front end of the third movable body 66. In the front-rear direction, an interval between the second movable body 64 and the one of the first movable bodies 62, an interval between the adjacent first movable bodies 62, and an interval between the other of the first movable bodies 62 and the third movable body 66 are maintained to be the same by the springs 68.

Next, how the two first movable bodies 62, the second movable body 64, the third movable body 66, and the three springs 68 behave when the pipe 54 extends or contracts will be described. As shown in FIG. 4, when the pipe 54 is in a most contracted state, the three springs 68 are most contracted. When the pipe 54 is in the most contracted state, an interval L2 between the second movable body 64 and one of the first movable bodies 62, an interval L2 between the adjacent first movable bodies 62, and an interval L2 between the other of the first movable bodies 62 and the third movable body 66 are maintained to be the same by the springs 68 in the front-rear direction. This suppresses vibrations in the pipe 54 accompanying the rotation of the shaft 60 as compared to a configuration in which the two first movable bodies 62, the second movable body 64, and the third movable body 66 are not disposed at regular intervals. The intervals L2 are longer than the interval L1 between the two first bearings 90 in the front-rear direction and are equal to a length of each spring 68 in the most contracted state.

Figure 7:
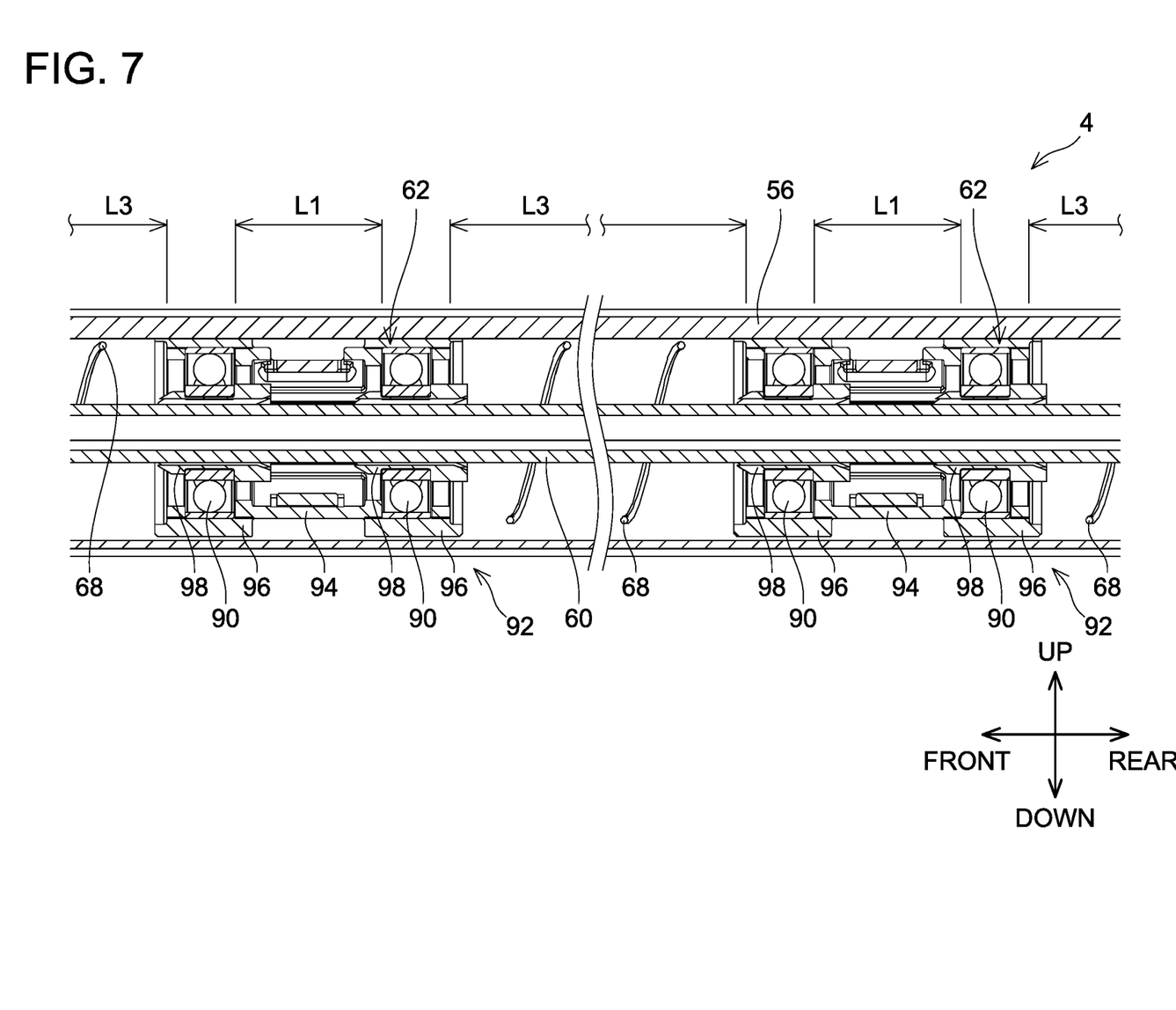
FIG. 7 is a cross-sectional view of the vicinity of the first movable bodies 62 of the working machine 2 in extended state according to the embodiment.

When the pipe 54 is extended to its maximum length by moving the inner pipe 58 frontward relative to the outer pipe 56, the second movable body 64 also moves frontward with the movement of the inner pipe 58, while the third movable body 66 is fixed to the rear end of the outer pipe 56 and thus does not move frontward. As a result, the contracted three springs 68 expand and the two first movable bodies 62 disposed between the second movable body 64 and the third movable body 66 move in a moving direction of the inner pipe 58 inside the outer pipe 56. Since the three springs 68 have the same configuration, the lengths of the three springs 68 after the expansion are the same. As shown in FIG. 7, when the pipe 54 is most extended to its maximum length, an interval L3 between the second movable body 64 and one of the first movable bodies 62, an interval L3 between the adjacent first movable bodies 62, and an interval L3 between the other of the first movable bodies 62 and the third movable body 66 are maintained to be the same by the springs 68 in the front-rear direction. This suppresses vibrations in the pipe 54 accompanying the rotation of the shaft 60 even when the shaft 60 rotates with the pipe 54 extended to its maximum length, as compared to a configuration in which the two first movable bodies 62, the second movable body 64, and the third movable body 66 are not disposed at regular intervals. The intervals L3 are longer than the interval L1 and the intervals L2, and are equal to the length of each spring 68 in the most contracted state.

In the embodiment, the working machine 2 comprises the pipe 54, the body unit 6, the tool unit 8, the shaft 60, and the speed increaser 44. As shown in FIG. 2, the body unit 6 is disposed at the rear end of the pipe 54 and comprises the motor 14. As shown in FIG. 3, the tool unit 8 is disposed at the front end of the pipe 54 and comprises the sprocket 48. The shaft 60 is disposed inside the pipe 54 and is configured to transmit power of the motor 14 to the sprocket 48. The speed increaser 44 is disposed between the shaft 60 and the sprocket 48. The speed increaser 44 is configured to make the rotational speed of the sprocket 48 higher than the rotational speed of the shaft 60. In this configuration, the rotational speed of the shaft 60 is lower than the rotational speed of the sprocket 48, even if the rotational speed of the sprocket 48 is set high to ensure cutting performance of the saw chain which is rotated by the rotation of the sprocket 48. Thus, vibrations in the working machine 2 accompanying the rotation of the shaft 60 can be suppressed as compared to a configuration in which the rotational speed of the shaft 60 is equal to or higher than the rotational speed of the sprocket 48. As a result, deterioration in the cutting performance of the saw chain rotated by the rotation of the sprocket 48 and aggravation of the vibrations in the working machine 2 can both be suppressed.

The working machine 2 further comprises the speed reducer 16 disposed between the shaft 60 and the motor 14. The speed reducer 16 is configured to make the rotational speed of the shaft 60 lower than the rotational speed of the motor 14. This configuration can make the rotational speed of the shaft 60 low as compared to a working machine 2 in which the speed reducer 16 is not disposed between the shaft 60 and the motor 14. Thus, the vibrations in the working machine 2 accompanying the rotation of the shaft 60 can be suppressed.

The rotational speed of the motor 14 is higher than the rotational speed of the sprocket 48. In this configuration, torque that is greater than output torque from the motor 14 can be obtained in the sprocket 48.

The speed reducer 16 comprises helical gears. This configuration disperses teeth contact of the gears as compared to a configuration with spur gears. Thus, vibrations in the working machine 2 accompanying torque change in the gears can be suppressed.

The speed increaser 44 comprises bevel gears. This configuration allows the rotation axis of the sprocket 48 to vary relative to the rotation axis of the shaft 60.

The motor 14 functions a prime mover. If the prime mover is an engine, vibrations of the engine itself are significant, thus the vibrations in the working machine 2 are caused by the vibrations of the engine itself rather than by the vibrations accompanying the rotation of the shaft 60. On the other hand, if the prime mover is the motor 14, the motor 14 itself hardly vibrates, thus the vibrations in the working machine 2 are caused by the vibrations accompanying the rotation of the shaft 60. The above configuration can suppress the vibrations in the working machine 2 as compared to a configuration in which the prime mover is an engine.

In the embodiment, the support rod 4 comprises the pipe 54, the shaft 60, the first movable body 62, and two springs 68. The pipe 54 is extendable and contractable in the front-rear direction. The shaft 60 extends inside the pipe 54 in the front-rear direction. The first movable body 62 is configured to move in the front-rear direction relative to the pipe 54 according to contraction and extension of the pipe 54. One of the springs 68 is in contact with one end of the first movable body 62 in the front-rear direction. The other of the springs 68 is in contact with another end of the first movable body 62 in the front-rear direction. The pipe 54 comprises the outer pipe 56 and the inner pipe 58. The outer pipe 56 accommodates the first movable body 62 therein. The inner pipe 58 is inserted in the outer pipe 56 and is movable in the front-rear direction relative to the outer pipe 56. As shown in FIG. 4, the first movable body 62 comprises the two first bearings 90 configured to rotatably support the shaft 60. The interval L1 between the two first bearings 90 adjacent to each other in the front-rear direction is constantly smaller than each of lengths of the springs 68 in the front-rear direction. In this configuration, the first movable body 62 comprises the two first bearings 90, thus the first movable body 62 supports the shaft 60 at two points. Further, the first movable body 62 moves in the front-rear direction relative to the pipe 54 according to contraction and extension of the pipe 54, thus even when the pipe 54 extends or contracts, the two first bearings 90 of the first movable body 62 support the shaft 60 at their post-movement positions. As such, vibrations of the pipe 54 accompanying the rotation of the shaft 60 can be suppressed as compared to a configuration in which the shaft 60 is supported at one point.

As shown FIG. 4, the first movable body 62 further comprises the retainer 94 configured to maintain the constant interval L1 between the two adjacent first bearings 90 in the front-rear direction. In this configuration, even when the pipe 54 extends or contracts, the interval L1 between the two adjacent first bearings 90 in the front-rear direction is maintained constant. Thus, even though the length of the pipe 54 changes accompanying the extension or contraction, the vibrations of the pipe 54 accompanying the rotation of the shaft 60 can stably be suppressed.

As shown in FIG. 4, the first movable body 62 further comprises the support 96 configured to support the two first bearings 90 and the retainer 94. In this configuration, the two first bearings 90 and the retainer 94 can be integrated by the support 96.

As shown in FIG. 5, the support rod 4 further comprises the second movable body 64 disposed at one end of the inner pipe 58 that is inserted to the outer pipe 56. The second movable body 64 comprises the second bearing 102 configured to rotatably support the shaft 60. According to the study by the inventor, it has been found that the pipe 54 tends to vibrate at the one end of the inner pipe 58 accompanying the rotation of the shaft 60. In the above configuration, the vibrations of the pipe 54 accompanying the rotation of the shaft 60 can be suppressed by the second bearing 102 of the second movable body 64 disposed at the one end of the inner pipe 58.

As shown in FIG. 5, the second movable body 64 further comprises the support 106 configured to support the second bearing 102. The support 106 is inserted to the one end of the inner pipe 58. In this configuration, the second movable body 64 can be arranged at the one end of the inner pipe 58 by simple work of inserting the support 106 to the one end of the inner pipe 58.

As shown in FIG. 5, an engagement receiving portion 112 is disposed at the one end of the inner pipe 58. The second movable body 64 further comprises the engagement portion 110 disposed on the support 106 and configured to engage with the engagement receiving portion 112. When the second movable body 64 is positioned at the one end of the inner pipe 58, the engagement portion 110 engages with the engagement receiving portion 112. This suppresses the second movable body 64 from slipping from the one end of the inner pipe 58.

The two springs 68 have the same configuration. In this configuration, even when the pipe 54 extends or contracts, the lengths of the two springs 68 are the same. This facilitates design for a position of the first movable body 62 in the front-rear direction in the extendable pipe 54.

As shown in FIG. 4, the support rod 4 comprises two first movable bodies 62. This configuration can further suppress the vibrations of the pipe 54 accompanying the rotation of the shaft 60 as compared to a configuration in which the support rod 4 comprises one first movable body 62.

As shown in FIG. 1, the working machine 2 comprises the support rod 4, the body unit 6, and the tool unit 8. The body unit 6 is disposed at the rear end of the support rod 4 and comprises the motor 14. The tool unit 8 is disposed at the front end of the support rod 4 and comprises the sprocket 48. The support rod 4 comprises the pipe 54, the shaft 60, the first movable body 62, and two springs 68. The pipe 54 is extendable and contractable in the front-rear direction. The shaft 60 extends inside the pipe 54 in the front-rear direction. The first movable body 62 is configured to move in the front-rear direction relative to the pipe 54 according to extension and contraction of the pipe 54. One of the springs 68 is in contact with one end of the first movable body 62 in the front-rear direction. The other of the springs 68 is in contact with another end of the first movable body 62 in the front-rear direction. The pipe 54 comprises the outer pipe 56 and the inner pipe 58. The outer pipe 56 accommodates the first movable body 62 therein. The inner pipe 58 is inserted in the outer pipe 56 and is movable in the front-rear direction relative to the outer pipe 56. As shown in FIG. 4, the first movable body 62 comprises the two first bearings 90 configured to rotatably support the shaft 60. The interval L1 between the two first bearings 90 adjacent to each other in the front-rear direction is constantly smaller than each of lengths of the springs 68 in the front-rear direction. In this configuration, the first movable body 62 comprises the two first bearings 90, thus the first movable body 62 supports the shaft 60 at two points. Further, the first movable body 62 moves in the front-rear direction relative to the pipe 54 according to extension and contraction of the pipe 54, thus even when the pipe 54 extends or contracts, the two first bearings 90 of the first movable body 62 support the shaft 60 at post-movement positions. Thus, vibrations of the pipe 54 accompanying the rotation of the shaft 60 can be suppressed as compared to a configuration in which the shaft 60 is supported at one point. Consequently, vibrations in the working machine 2 can be suppressed.

The first holder 92, the second holder 104, and the third holder 118 are constituted of the resin materials. In this configuration, even when the holders 92, 104, and/or 118 contact the pipe 54 due to the rotation of the shaft 60, impact caused by the contact with the pipe 54 is small as compared to a configuration in which each of the holders 92, 104, 118 is constituted of a metal material. Thus, the vibrations in the pipe 54 accompanying the rotation of the shaft 60 can be suppressed.

(Corresponding Relationships)

The sprocket 48 is an example of "front tool" and the rotational speed of the sprocket 48 is an example of "rotational speed of the front tool". The springs 68 are examples of "first spring" and "second spring". The support 96 is an example of "first support" and the support 106 is an example of "second support". The front-rear direction is an example of "longitudinal direction".

In an embodiment, the rotational speed of the drive shaft 46 may be higher than the rotational speed of the motor shaft 14a of the motor 14.

In an embodiment, the gears of the speed reducer 16 of are not limited to helical gears. The speed reducer 16 may comprise, for example, bevel gears or spur gears.

In an embodiment, the gears of the speed increaser 44 are not limited to bevel gears. The speed increaser 44 may comprise, for example, helical gears or spur gears.

In an embodiment, the body unit 6 may comprise an engine instead of the motor 14.

In an embodiment, the working machine 2 may be supplied with power by a power cable instead of by the battery B.

In an embodiment, an intermediate spring may be disposed, instead of the retainer 94, between the adjacent first bearings 90. The intermediate spring may be less expandable (i.e., have a higher spring constant) than the springs 68. In this case, a length of the intermediate spring is smaller than the lengths of the springs 68 at all times regardless of the extension or contraction of the pipe 54.

In an embodiment, the second movable body 64 may be engaged with the rear end of the inner pipe 58 without being inserted into the rear end of the inner pipe 58.

In an embodiment, an engagement receiving portion may be formed in the support 106 of the second movable body 64 and an engagement portion may be disposed on the inner pipe 58.

In an embodiment, the three springs 68 may have different configurations from each other. For example, the three springs 68 may have different spring constants and different lengths.

In an embodiment, the first movable body 62 may comprise three or more first bearings 90.

In an embodiment, the support rod 4 may comprise one first movable body 62 or may comprise three or more first movable bodies 62.

In an embodiment, the working machine 2 may, for example, be a pole hedge trimmer, a 10 trimmer, or a palm tree cutter.

In an embodiment, the pipe 54 may be a flexible pipe.

In an embodiment, the first holder 92, the second holder 104, and the third holder 118 may be constituted of metal materials.

What is claimed is:

1. A working machine, comprising:
   a pipe;
   a body unit disposed at a rear end of the pipe and comprising a grip configured to be gripped by an operator and a prime mover;
   a tool unit disposed at a front end of the pipe and comprising a front tool;
   a shaft disposed inside the pipe and configured to transmit power of the prime mover to the front tool;
   a bearing disposed inside the pipe and rotatably supporting the shaft;
   a speed reducer disposed between the shaft and the prime mover; and
   a speed increaser disposed between the shaft and the front tool,
   wherein
   the speed reducer is configured to make a rotational speed of the shaft lower than a rotational speed of the prime mover,
   the speed increaser is configured to make a rotational speed of the front tool higher than the rotational speed of the shaft, and
   the rotational speed of the prime mover is higher than the rotational speed of the front tool.

2. The working machine according to claim 1, wherein the speed reducer comprises helical gears.

3. The working machine according to claim 1, wherein the speed increaser comprises bevel gears.

4. The working machine according to claim 1, wherein the prime mover is a motor.

* * * * *